United States Patent [19]

Brown et al.

[11] 4,384,491
[45] May 24, 1983

[54] ANALOG ULTRASONIC FLOWMETER

[75] Inventors: Alvin E. Brown, Santa Cruz, Calif.; Rodney C. Johnson, Peacehaven, England

[73] Assignee: Bestobell Sparling Ltd., Sussex, England

[21] Appl. No.: 227,457

[22] Filed: Jan. 22, 1981

[51] Int. Cl.³ .............................................. G01F 1/66
[52] U.S. Cl. .................................................. 73/861.28
[58] Field of Search ........................ 73/862.27, 862.28

[56] References Cited

U.S. PATENT DOCUMENTS 4,022,058 5/1977 Brown .............................. 73/861.28

Primary Examiner—Charles A. Ruehl
Attorney, Agent, or Firm—Thomas E. Schatzel

[57] ABSTRACT

A meter for measuring the velocity of a fluid by ascertaining propagation periods of acoustic wave packets transmitted therein, the meter including a pair of transducers for disposition in the fluid, a transmitter for transmitting a packet between the transducers in an upstream or downstream direction designated by an up/down signal at each time designated by a transmit signal and a receiver for developing a received signal marking the time of receipt by a transducer of each packet, the times being marked so as to avoid amplitude and half-cycle ambiguity errors. The meter also includes a phase detector for comparing the received times with those marked by a reference signal to develop early and late pulses, a decoder and a pair of integrators for developing from the pulses a pair of integrated signals representing changes in the upstream and downstream propagation periods, another integrator for combining the integrated signals to develop a signal representing the acoustic velocity of the fluid and an amplifier for combining the integrated signals to develop a signal representing the velocity of the fluid. Further, the meter includes a ramp generator for developing the up/down signal, a ramp signal and the transmit signal from the acoustic velocity signal and the combination of a multiplexer, a multiplier and a comparator for developing the reference signal, the multiplier for developing a signal inversely proportional to the acoustic velocity signal and multiplying it by a signal developed by multiplexing the integrated signals.

14 Claims, 6 Drawing Figures

Fig_1

Fig_3

Fig_4

ANALOG ULTRASONIC FLOWMETER

BACKGROUND OF THE INVENTION

1. Field of the Invention

The present invention relates generally to meters for measuring the velocity of a fluid and more particularly to an acoustic-type flow meter in which basic loop timing is derived from each of a series of ramps.

2. Description of the Prior Art

The operation of fluid-flow-measuring meters of the acoustic type is based upon the principle that the propagation velocity of an acoustic wave in a fluid is equal to the acoustic velocity with respect to the fluid plus the velocity of the fluid. Typically, such meters include a pair of acoustic transducers each adapted for both generating and detecting an acoustic pressure wave in a fluid the velocity of which is to be measured. The transducers are so disposed as to define a communication link therebetween, which extends, at least obliquely, along the direction of fluid flow. The meters transmit an acoustic-wave packet, in turn, in alternate directions across the link while measuring the acoustic propagation period, also referred to as the acoustic time of flight, in both the upstream and the downstream directions. Finally, a difference between the upstream and downstream propagation periods is determined providing a measure of the line integral through a velocity profile across the link of the component of fluid flow in the direction of the link, usually referred to simply as the fluid velocity or fluid flow rate.

Representative of prior-art acoustic flow meters of the digital type is the one which is disclosed by Munston et al. in U.S. Pat. No. 3,894,431. In addition to a pair of transducers defining a communication link through a fluid the velocity of which is to be measured, the disclosed prior-art meter includes a pair of phase-locked loops. Each phase-locked loop has a voltage-controlled oscillator, referred to as a vco, frequency synchronized by the loop so as to generate a relatively high frequency signal that cycles n times during the period in which an acoustic wave propagates a respective direction across the link. Also included in the above-mentioned prior-art meter is control circuitry having a control oscillator for coordinating access to the link, and difference circuitry to combine the two vco generated signals to generate a difference signal having a frequency which represents the fluid velocity.

More particularly, in addition to the above-mentioned vco, each of the phase-locked loops includes an integrator for developing a vco-frequency-controlling potential and a transmit flip-flop reset by a cycle of the control oscillator and set by the cycle of the vco signal next following. The flip-flop develops a transmit-triggering signal marking the flip-flop-setting cycle of the vco.

Also reset by the flip-flop-resetting cycle of the control oscillator is a divide by n counter clocked by cycles of the vco signal. The counter develops a reference signal marking the nth vco cycle following the resetting cycle of the control oscillator. The transmit-triggering signal developed by the flip-flop and the nth cycle reference signal developed by the counter delineate an n-cycle reference period for comparison with the respective acoustic propagation period.

Also included in each phase-locked loop is a transmitter for exciting a respective one of the transducers to develop an acoustic-wave packet for propagation across the link and a receiver for amplifying a signal developed by the other one of the transducers responsive to the acoustic-wave packet transmitted across the link. The receiver has automatic-gain-controlling circuitry for controlling the gain of the receiver responsive to the level of the amplified signal and a zero-crossing-detector for developing a received signal responsive to a zero crossing within the packet of the amplified signal. The transmit signal and the received signal delineate a propagation period over a respective direction of the link.

In addition, each of the phase-locked-loops includes a phase detector for comparing the time marked by the nth cycle signal with that of the received signal to develop a complementary pair of error signals and a pair of monostable multivibrators driven by the error signals for appropriately incrementing or decrementing the integrator. The phase detector is of the non-linear, or bang-bang type, developing the error signals so as to indicate whether the nth cycle signal occurred before or after the received signal, in other words early or late. Responsive to each pair of early or late error signals, a respective one of the multi-vibrators develops a constant-width integrator-driving pulse for incrementing or decrementing by a fixed amount the charge stored by the integrator to increment or decrement slightly the vco controlling potential developed by the integrator thereby adjusting the operating frequency of the vco.

The control oscillator is operative to reset, in turn, each of the phase-locked loops thereby coordinating access to the link. In addition to the control oscillator, the control circuitry includes a delay circuit driven by the control oscillator and a strobe circuit driven by the delay circuit, the delay and strobe circuits for developing a receiver-enabling window signal for reducing the susceptibility of the receiver to noise.

Unfortunately, the circuitry employed by digital-type acoustic flow meters is relatively complex and expensive. Also, as a result of the relatively high frequencies employed by the vcos and the switchings transients associated with the counters and other digital circuitry of digital-type acoustic flow meters, sensitivity limiting noise is generated.

Brown et al. in U.S. Pat. No. 3,981,191 discloses an acoustic flow meter which is more nearly analog in nature. Rather than employing the frequency of a signal generated by a suitably locked vco as a measure of the fluid velocity, the above-mentioned prior-art meter employs the vco controlling potential. This also permits a single time-multiplexed phase-locked loop to be employed. The phase-locked loop develops early and late error signals which are suitably combined in a pair of integrators to develop a first potential that represents the acoustic velocity in the fluid and a second potential that represents the velocity of the fluid. From the first and second potentials sum and different potentials are developed which are multiplexed to control a single vco to delineate a pair of reference periods for comparison with an upstream and a downstream propagation period.

More particularly, the phase-locked loop also includes a divide-by-four counter driven by the vco, a transmitter and a receiver both coupled by a switch to a pair of acoustic transducers, a comparator, error-decoding logic circuitry, a pair of integrators and an adder. Clocked by cycles of the vco, the counter develops a signal for controlling the state of the switch, a signal for triggering the transmitter and an nth cycle reference signal. Together, the transmitter-triggering signal and the nth-cycle reference signal delineate, at different times, a pair of reference periods.

The transmitter and the receiver are so coupled by the switch to the pair of transducers that the state of the switch controls the direction across the transducer-defined link that an acoustic-wave packet is transmitted. The transmit-triggering signal and the responsive receiver-developed signal together delineate a propagation period across a respective direction of the link.

The time marked by the nth-cycle reference signal is compared with respect to that of the received signal by the comparator which develops an error signal having but two states, specifically: received signal early and received signal late.

The received early signals are subtracted from the received late signals in a first one of the integrators to develop the first potential, which represents the average of the two propagation periods, in other words, the acoustic velocity in the fluid.

Next, the upstream and the downstream components of the early and late signals are separated by the error-decoding logic circuitry using the switch-state-controlling signal to develop four signals for driving the second integrator. The four separated signals include an early upstream signal, a late downstream signal, an early downstream signal and a late upstream signal, which are combined in a second integrator such that the former two signals are subtracted from the latter two signals. Responsive to the combined signals, the second integrator develops the second potential representing the velocity of the fluid.

Finally, the adder, time multiplexed by the switch-state-controlling signal, combines the first and the second potentials so as to develop the time multiplexed sum and difference potentials for controlling, in a time multiplexed fashion, the frequency of the vco.

It should be noted that the fluid velocity as measured by the two above-mentioned prior-art meters is independent of the acoustic velocity. Although each of the equations which relate a vco frequency to a respective propagation period, contain as a term in the numerator, the acoustic velocity, the acoustic-velocity terms cancel when these equations are combined to develop an equation for the flow velocity.

The accurate measurement of the velocity of heterogeneous fluids present special problems for acoustic-type flow meters. Of course, if two few acoustic-wave packets are received, flow measurement may become impractical. In addition, gas bubbles, particular matter, etc. can cause attenuation and scattering of the packets which so attenuates and/or alters the shape of the leading edge of packets so as to degrade the accuracy of fluid velocity measurements. Obviousy, the shape and amplitude of the acoustic-wave packet can effect period measurements where edge triggering is employed, even when combined with agc circuitry. Even with the use of simple zero crossing detectors, the change in shape of the leading edge of the acoustic wave can cause the zero-crossing detector to skip between adjacent cycles of the signal representing acoustic-wave packets, degrading the accuracy of the meter.

SUMMARY OF THE PRESENT INVENTION

It is therefore an object of the present invention to provide an accurate acoustic-type flow meter for measuring the flow velocity of heterogeneous fluids.

Another object of the present invention is to provide an acoustic-type flow meter which is both simple and economical.

Still another object of the present invention is to provide an acoustic-type flow meter which is mostly analog in nature.

Briefly, the preferred embodiment of the present invention comprises a time-multiplexed phase-locked loop including a subsystem having a pair of transducers defining a communications link through a fluid the velocity of which is to be measured, a transmitter triggered by a transmit signal, the transmitter for exciting a one of the transducers selected by an up/down signal to transmit an acoustic-wave packet in an upstream or a downstream direction across the link, an amplifier for developing an amplified signal from a signal developed by the other one of the transducers when excited by the acoustic-wave packet, an agc circuit coupled to the transmitter for controlling the transducer excitation level to maintain at a constant level the amplified-signal and a signal detector. The detector includes circuitry for comparing the instantaneous amplitude of the amplified signal with a positive and a negative reference potential to detect a half-cycle of the amplified signal developed responsive to the leading edge of an acoustic-wave packet. Upon detecting such a half-cycle, the circuitry of the detector adjusts the levels of the positive and the negative reference potentials, if necessary, to a state favoring that polarity half-cycle most recently detected. Then, the detector circuitry counts a predetermined number of the zero crossings of the amplified signal occurring following the detected half-cycle to develop a received signal which is timed to a relatively stable portion of the amplified signal.

Also included is a subsystem having a phase detector for comparing the time marked by a reference signal with that of the received signal and for developing a pulse when the reference signal is early and another pulse when the reference signal is late, a circuit for separating the early and late pulses responsive to the up/down signal, a first integrator for combining, with differing sign, early and late upstream pulses to develop a first potential, a second integrator for combining with differing sign early and late downstream pulses to develop a second potential, a summing amplifier for combining, with differing sign, the first and the second potentials to develop a signal which represents the velocity of the fluid and a third integrator for combining, with similar sign, the first and the second potentials to develop a third potential which represents the acoustic velocity in the fluid.

Another included subsystem has a ramp generator for developing a series of ramps each having a slope controlled by the third potential, for developing the up/down signal, the state of which alternates with successive ones of the ramps, and for developing the transmit signal timed with the beginning of each ramp, a circuit responsive to the up/down signal for combining in timed multiplexed fashion the first and the second potentials, a circuit for multiplying the multiplexed signal by a signal representing the inverse of the acoustic velocity in the fluid and a circuit for comparing the multiplied multiplexed signal with the ramp signal to develop the reference signal.

The ability to measure the velocity of heterogeneous fluids is a material advantage of the present invention.

The present invention is additionally advantageous in that it employs a ramp as a reference for timing measurements.

Other advantages of the present invention include its simplicity and its economy.

These and other objects and advantages of the present invention will no doubt become apparent to those skilled in the art after reading the following detailed description of the preferred embodiment which is illustrated in the several figures of the drawing.

IN THE DRAWING

DETAILED DESCRIPTION OF THE PREFERRED EBODIMENT

Figure 1:
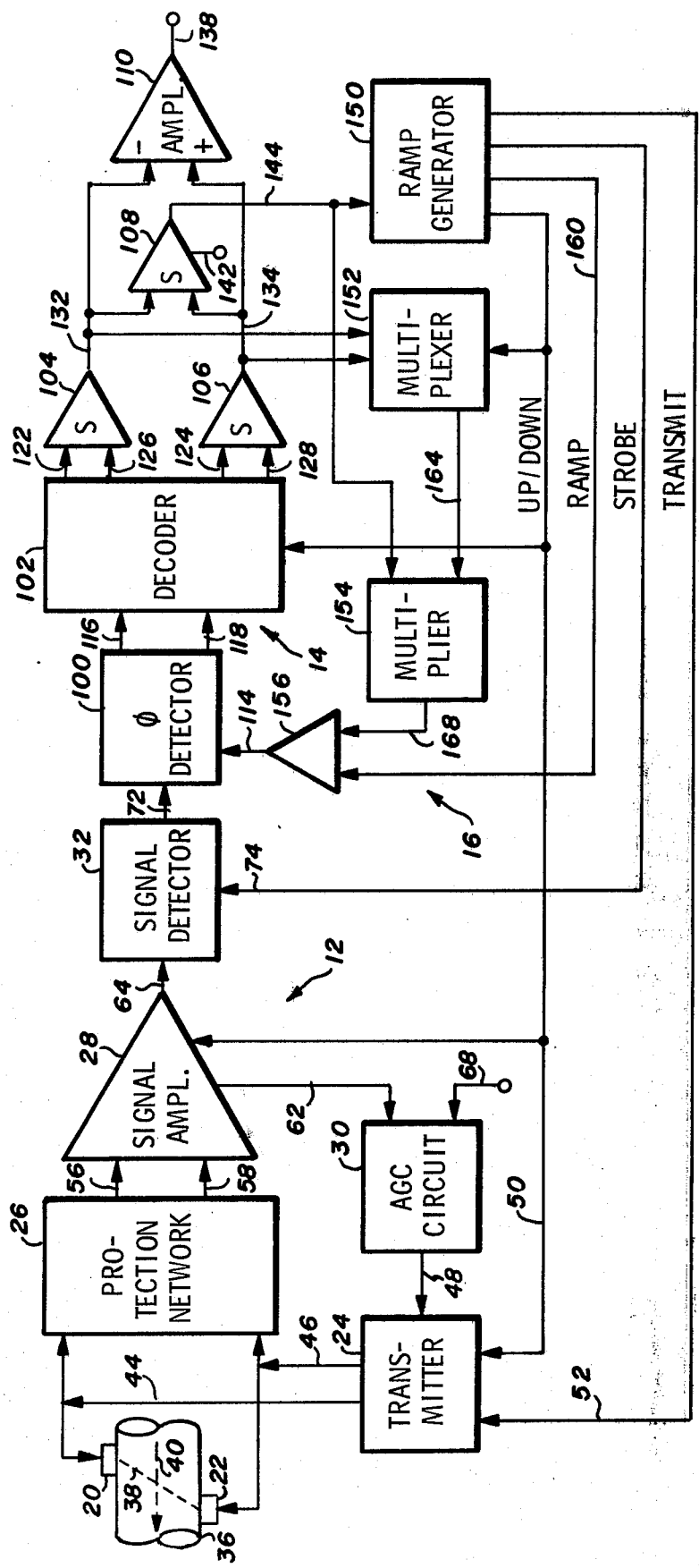
FIG. 1 is a block diagram illustrating the principal components of an acoustic-type flow meter in accordance with the present invention.

The preferred embodiment of an acoustic-type flow meter in accordance with the present invention is illustrated in FIG. 1 generally designated by the number 10. Meter 10 may be divided into a number of subsystems including a subsystem 12 for acoustic-wave transmission, a subsystem 14 for error detection and summation and a subsystem 16 for reference-signal generation. The principal components of subsystem 12 include a pair of acoustic transducers 20 and 22, a transmitter 24, a protection network 26, a signal amplifier 28, an agc circuit 30 and a signal detector 32. Transducers 20 and 22 are of the type which are suitable for both generating and receiving an acoustic pressure wave in a fluid the velocity of which is to be measured. Transducers 20 and 22 are so disposed as to define therebetween a communications link which extends, if not parallel with, then at least at an oblique angle with respect to, the direction of fluid flow.

As illustrated, transducers 20 and 22 are mounted within the wall of a conduit 36 so as to define a link, illustrated by dashed line 38, which extends across the conduit at an oblique angle with respect to the direction of fluid flow, illustrated by dashed arrow 40. In the preferred embodiment, transducers 20 and 22 each include an isolation transformer and a crystal of the type which is designated in the art PZT-5A.

Transducers 20 and 22 are, in turn, shock excited by transmitter 24 to generate a series of acoustic wave packets for transmission in alternate directions across the link. More specifically, transmitter 24, which is of prior-art design, includes a pair of storage capacitors one of which being coupled by a line 44 to transducer 20 and the other being coupled by a line 46 to transducer 22. The capacitors are charged to the potential of an agc signal developed by agc circuit 30 and coupled to transmitter 24 by a line 48. Each of the capacitors is selected, in turn, in response to appropriate states of a pair of complementary up/down signals coupled to transmitter 24 by a 2-line bus 50. Next, when triggered by a transmit signal coupled to transmitter 24 by a line 52, the charge on the selected capacitor is dumped across the respective one of transducers 20 and 22 to generate one of the acoustic wave packets.

Each of the acoustic wave packets, not lost in the fluid, in time, excites the transducer at the distal end of the link to develop a signal which is coupled by protection network 26 to signal amplifier 28. Network 26 includes circuit elements for protecting amplifier 28 from signals developed when transmitter 24 excites one of the transducers. In the preferred embodiment, network 26 includes a current-limiting resistor coupling the transducer-developed signal on line 44 to a line 56 and another current-limiting resistor coupling the transducer-developed signal on line 46 to a line 58. Also included is a pair of potential-limiting diodes connected in parallel, back-to-back, between line 56 and circuit ground and a similar pair of diodes connected from line 58 to circuit ground.

Selection and amplification of the appropriate transducer-developed signal is afforded by amplifier 28. Amplifier 28 has a pair of signal inputs connected to respective ones of the lines 56 and 58 for receiving both of the transducer-developed signals. Additionally, amplifier 28 has a control input connected to a line of bus 50 for receiving a proper one of the up/down signals for selecting for amplification the appropriate transducer-developed signal. From the selected transducer-developed signal, amplifier 28 develops an amplified signal on line 62 and a further amplified signal on a line 64.

In the preferred embodiment, amplifier 28 is of prior-art design including a first device of the type which is designated MC1445 by the Motorola Corporation and a second and a third device both of the type which is designated CA3002 by the RCA Corporation, all having a gain of approximately 20 db. The first device has a pair of signal inputs connected to respective ones of lines 56 and 58, a control input connected to line 62 and a pair of differential outputs. The second device has a pair of differential inputs ac coupled to respective ones of the outputs of the first device and an output resistively coupled to a parallel tank circuit that is connected to line 62. The third device has an input ac coupled to a gain setting potentiometer connected between line 62 and circuit ground and an output ac coupled to line 64.

To assist the accurate measurement of the propagation period of each acoustic wave packet, agc circuit 30 develops the transmitter controlling agc signal on line 48 to adjust the transducer excitation level so as to maintain at constant level the amplified signals developed on lines 62 and 64. The level of the amplified signal developed on line 62, responsive to each acoustic wave packet, is compared with a reference potential. Responsive thereto, the level of the agc signal is incremented or decremented slightly to adjust the level at which the successive acoustic wave packet is generated.

More particularly, circuit 30, which is also of prior-art design, includes a transistor, a D-type flip-flop, a steering circuit, an integrator and a voltage amplifier. The emitter-base junction of the transistor is coupled by a base-current-limiting resistor between line 62 and circuit ground, and the collector of the transistor is connected to the clocking input of the flip-flop. In this configuration, unless the peak excursion of the first amplified signal exceeds the transistor emitter-basejunction potential, the flip-flop remains in the reset state. Otherwise, the flip-flop is clocked to the other state. The complementary outputs of the flip-flop are coupled by the steering circuit to the integrator. The output of the integrator drives the amplifier which develops the agc signal on line 48 from a high voltage power supply potential developed on a line 68. Dependent upon the state of the flip-flop, the charge stored by the integrator is incremented or decremented, incrementing or decrementing the potential level of the agc signal developed on line 48.

From a relatively stable zero crossing of the amplified signal developed on line 64, signal detector 32 develops a received signal on a line 72 for timing the propagation period of each of the acoustic wave packets. More particularly, after being reset by a strobe signal developed on a line 74, detector 32 compares the instantaneous amplitude of the amplified signal developed on line 64 with both a positive and a negative reference potential to detect a half-cycle of the amplified signal developed responsive to the leading edge of an acoustic wave packet. When such a half-cycle is detected, detector 32 adjusts, if necessary, the reference potentials to a one of a pair of states favoring that polarity of half-cycle most recently detected. Additionally, detector 32 develops the received signal on line 72 so as to mark a predetermined zero crossing thereof. As a result of the manner in which the zero crossings are counted, should detector 32 first detect a half-cycle of the amplified signal one half-cycle later than that normally detected, the detector still develops the received signal on line 72 so as to mark the same zero crossing.

The principal components of subsystem 14 include a phase detector 100, a decoder 102, three integrators 104, 106 and 108 and a summing amplifier 110. Phase detector 100 compares the actual time of arrival of each acoustic wave packet with an expected time of arrival by comparing the received signal developed on line 72 with a reference signal developed on a line 114. When the received signal developed on line 72 indicates that an acoustic wave packet arrived after the time expected evidenced by the received signal developed on line 114, i.e., late, a pulse of predetermined width is developed on a line 116 triggered by the received signal. On the other hand, when the received signal indicates that an acoustic-wave packet arrived before the time expected, again evidenced by the reference signal, i.e., early, a pulse is developed on a line 118, also triggered by the received signal. Absent a received signal, when an acoustic-wave packet is lost, no pulse is developed on either of lines 116 or 118.

Decoder 102 separates those ones of the late and early pulses which correspond to acoustic wave packets transmitted in an upstream direction across the link from those which correspond to packets transmitted in a downstream direction. More particularly, responsive to the up/down signals developed on bus 50, decoder 102 separates the late pulses developed on line 116 to develop late-upstream pulses on a line 122 and late-downstream pulses on a line 124. Similarly, decoder 102 separates the early pulses developed on line 118 to develop early-upstream pulses on a line 126 and early-downstream pulses on a line 128 responsive to the up/down signals developed on bus 50.

From a stored charge, integrator 104 develops a first potential on a line 132. The stored charge is incremented responsive to each of the early-upstream pulses developed on line 126 and decremented responsive to each of the late-upstream pulses developed on line 122, incrementing or decrementing, respectively, the level of the first potential developed on line 132. The first potential developed on line 132 corresponds to a change in the upstream propagation period with respect to that without flow.

In a similar fashion, integrator 106 develops a second potential on a line 134 from each of the early-downstream pulses developed on line 128 and the late-downstream pulses developed on line 124. The second potential developed on line 134 corresponds to a change in the downstream propagation period with respect to that without flow.

Summing amplifier 110 combines, with differing sign, the first and second potentials developed on lines 132 and 134, respectively, to develop a potential on a line 138 which is proportional to the velocity of the fluid.

Integrator 108 develops an intermediate potential which is proportional to the integral of the sum of the first potential developed on line 132 and the second potential developed on line 134. To the intermediate potential is added a constant level potential developed on a line 142 to develop a third potential on a line 144 which corresponds to the acoustic velocity, or sound speed, of the fluid. By the use of the constant level potential developed on line 142, the sum of the first and the second potentials developed on line 132 and line 134 may be forced to zero. The intermediate potential corresponds to a change in acoustic velocity.

The principal components of reference signal generating subsystem 16 include a ramp generator 150, a multiplexer 152, a multiplier 154 and a comparator 156. Ramp generator 150 develops on a line 160 a signal in the form of a series of similar linear ramps each having a slope controlled by the third potential developed on line 144. In addition, generator 150 develops the complementary up/down signals on bus 50 so as to have states which alternate with successive ones of the ramps of the signal developed on line 160, the strobe signal on line 74 timed to each of the ramps to delineate a range of expected time of arrivals of acoustic-wave packets and the transmit signal on line 52 so as to mark a time near the beginning of each of the ramps.

Multiplexer 152 alternately selects one of the first and the second signals developed on respective ones of the lines 132 and 134, responsive to the up/down signals and couples the selected signal to a line 164 (developing a chopped signal).

From the acoustic-velocity-indicating third signal developed on line 144, multiplier 154 develops an intermediate signal that is inversely proportional to the acoustic velocity. The multiplier multiplies the multiplexed signal developed on line 164 by this intermediate signal to develop a multiplied-multiplexed signal on a line 168.

Comparator 156 develops the reference signal on line 114 so as to mark the times at which the instantaneous potential level of the ramps of the signal developed on line 160 coincide with that of the multiplied-multiplexed signal developed on line 168.

Acoustic flow meter 10 operates as a time-multiplexed phase-locked loop in which basic loop timing is derived from each of the series of ramps comprising the signal developed by ramp generator 150 on line 160. From each of the ramps, generator 150 develops the transmit signal on line 52 marking a time near the beginning of each of the ramps for the transmission of an acoustic-wave packet and the strobe signal on line 74 delineating the range of propagation periods to provide noise rejection. Additionally, the reference signal marking the anticipated time of arrival of each acoustic-wave packet is developed on line 114 by comparator 156 from the basic timing of each of the ramps as modified for the fluid velocity by the multiplied-multiplexed signal developed on line 168.

Since the slope of each of the ramps is controlled by the acoustic-velocity-indicating third potential developed on line 150, the basic ramp timing automatically adjusts for variations in the acoustic velocity of the fluid. It is important to note, however, that the ramps developed by generator 150 are otherwise independent of the loop and fluid parameters and in particular the fluid velocity and the direction of acoustic wave propagation.

To provide for both upstream and downstream transmission, the basic loop is time-multiplexed, modifying certain states of the loop with alternate ones of the ramps, as defined by the up/down signals developed by generator 150 on bus 50.

Each time transmitter 24 is triggered by the transmit signal developed on line 52 by ramp generator 150, transmitter 24 excites a one of transducers 20 and 22 selected by the up/down signal developed by the generator on bus 50 to transmit an acoustic-wave packet a respective direction across link 38. During this time, protection network 26 limits the level of signals coupled to signal amplifier 28, protecting the amplifier from the excitation signal. In due course, the acoustic-wave packet excites the other one of transducers 20 and 22 which develops a signal on a corresponding one of lines 44 and 46 that is coupled by protective network 26 to amplifier 28. The transducer developed signal is amplified by amplifier 28 while the signal developed by the excited transducer is rejected, responsive to the up-/down signal developed on bus 50. Responsive to the strobe signal developed on line 74, signal detector 32 develops the received signal on line 72 marking the predetermined stable zero crossing of the amplified signal developed by amplifier 28 on line 64.

Phase detector 100 compares each of the times marked by the received signal developed on line 72 with those marked by the reference signal developed on line 114 and, responsive thereto, develops either a received-signal-late pulse on line 116 or a received-signal-early pulse on line 118, responsive to the received signal. Responsive to the up/down signals developed on bus 50, decoder 102 couples the late or early pulse developed by detector 100 to the appropriate one of integrators 104 and 106 to correct the signal developed thereby.

During this time, the signal developed by the appropriate one of integrators 104 and 106 is coupled by multiplexer 152 to line 164 where it is conditioned by multiplier 154 to develop the multiplied-multiplexed signal on line 168 employed by comparator 156 to develop the reference signal on line 114. Finally, from the first and the second signals developed on respective ones of lines 132 and 134, summing amplifier 110 develops the signal on line 138 which is proportional to the fluid velocity.

As previously indicated, basic loop timing is derived from each of the series of similar ramps comprising the signal developed on line 160. A mathematical analysis of the fluid velocity signal developed on line 138 based upon the difference between a pair of equations derived by substituting the upstream and the downstream propagattion periods into the single straight line equation representing each of the ramps of the signal developed on line 160 indicates that, but for multiplier 154, the fluid velocity signal would be inversely dependent upon the acoustic velocity in the fluid. From the acoustic velocity-representing-third signal developed on line 144, multiplier 154 develops a transfer function which is also inversely dependent upon the acoustic velocity. As a result of the inclusion within the loop of the multiplier, the loop, and in particular integrators 104 and 106, are forced to compensate for the effect of the multiplier, developing signals on lines 132 and 134 which are independent of the acoustic velocity.

Figure 2:
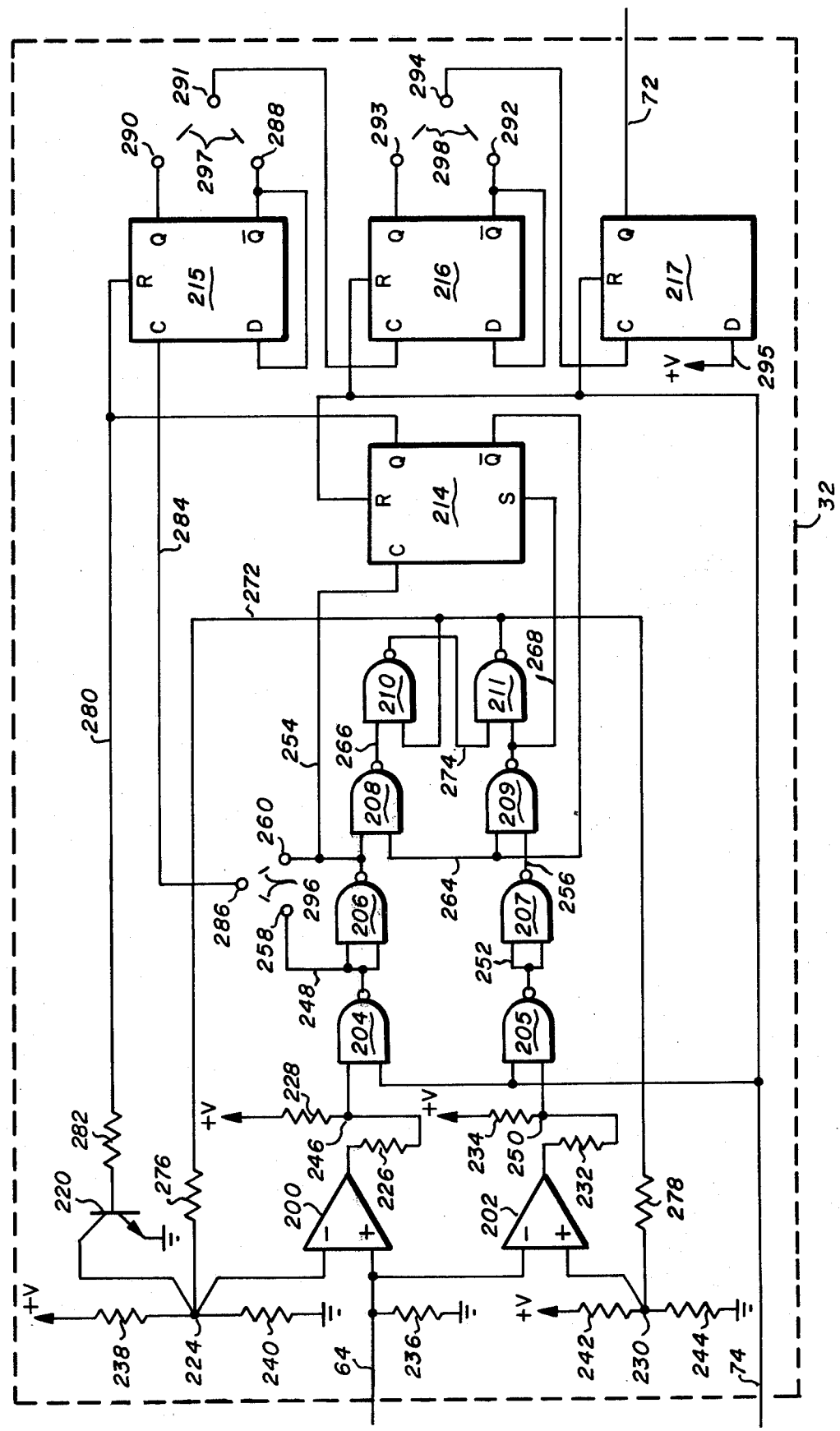
FIG. 2 is a schematic diagram further illustrating the signal detector shown in FIG. 1.

Turning now to FIG. 2, a schematic diagram further illustrating signal detector 32 is shown. The principal components of detector 32 include two comparators 200 and 202, eight 2-input NAND gates 204–211, four D-type flip-flops 214–217 and an NPN transistor 220. Comparators 200 and 202 are connected so as to compare the instantaneous amplitude of the amplified-transducer-developed signal developed on line 64 with a positive and a negative reference potential respectively.

More particularly, comparator 200 has an inverting input coupled to a node 224 for receiving the positive reference potential, a non-inverting input connected to line 64 and an output coupled by the series combination of a pair of voltage-divider resistors 226 and 228 to a positive-power-supply potential for developing a TTL logic level output signal. Comparator 202 has an inverting input connected to line 64, a non-inverting input coupled to a node 230 for receiving the negative reference potential and an output coupled by the series combination of a pair of voltage-divider resistors 232 and 234 to a positive-power-supply potential. Line 64 is coupled to circuit ground by a biasing resistor 236. The positive reference potential is developed at node 224, in part, by a pair of voltage-divider resistors including a resistor 238 connected from a positive power supply potential to node 224 and a resistor 240 connected from node 224 to circuit ground. The negative reference potential is developed at node 230, in part, by a voltage-divider resistor 242 connected from a negative-power-supply potential to the node and another voltage-divider resistor 244 connected from the node to circuit ground.

Gates 204 and 205 are connected so as to disable detector 32 except during a time interval delineated by the strobe signal developed on line 74. Gate 204 has an input connected to the juncture of resistors 226 and 228 at a node 246 to receive the signal developed by comparator 200, another input connected to line 74 for receiving the strobe signal and an output connected to a line 248. Similarly, gate 205 has an input connected to a node 250 at the juncture of resistors 232 and 234, another input connected to line 74 and an output connected to a line 252.

Gates 206 and 207 are wired as inverters, gate 206 between line 248 and a line 254 and gate 207 between a line 252 and a line 256. Lines 248 and 254 are each additionally connected to a respective one of a pair of terminals 258 and 260.

Responsive to a signal developed by flip-flop 214, the comparator developed signals are coupled by gates 208 and 209 to gates 210 and 211 until a half-cycle of the amplified-transducer-developed signal representing the leading edge of an acoustic-wave packet is detected. Gate 208 has an input connected to line 254 for receiving the comparator developed signal, another input coupled to flip-flop 214 by a line 264 for receiving a gating signal developed thereby and an output connected to an input of gate 210 by a line 266. Similarly, gate 209 has an input connected to line 256, another input connected to line 264 and an output connected to an input of gate 211 by a line 268.

Gates 210 and 211 are connected as a set-reset flip-flop to store a signal representing the polarity of the half-cycle most recently detected and, based thereon, to augment the positive and negative reference potentials to favor that polarity half-cycle. Gate 210 has another input coupled by a line 272 to the output of gate 211 which has another input coupled by a line 274 to the output of gate 210. Bias from the augmenting logic-level potential developed by the flip-flop comprising gates 210 and 211 on line 272 is coupled by a voltage divider resistor 276 to node 224 and by another voltage divider resistor 278 to node 230.

The function of detector 32 is switched from half-cycle detecting to zero-crossing counting by flip-flop 214. Flip-flop 214 has a resetting input connected to line 74 for preparing the flip-flop for another acoustic-wave-packet representing a portion of the amplified transducer developed signal, a clocking input connected to line 254 and a setting input connected to line 268 both for changing the state of the flip-flop responsive to a detected half-cycle, an output connected to a line 280 and a complementary output connected to line 264. Transistor 220 has an emitter connected to circuit ground, a collector connected to node 224 and a base coupled by a base current limiting resistor 282 to line 280, the transistor for shorting to circuit ground the positive reference potential when detector 32 is counting zero crossings.

Flip-flops 215, 216 and 217 count the zero crossings of the amplified-transducer-developed signal. Flip-flop 215 has a resetting input connected to line 280, a clocking input coupled by a line 284 to a terminal 286, a data input and a complementary output both connected to a terminal 288 and another output connected to a terminal 290. Flip-flop 216 has a resetting input connected to line 74, a clocking input connected to a terminal 291, a data input and a complementary output both connected to a terminal 292 and another output connected to a terminal 293. Finally, flip-flop 217 has a resetting input connected to line 74, a clocking input connected to a terminal 294, a data input coupled to a high logic level potential by a line 295 and an output connected to line 72.

Three jumpers permit the number of zero crossings to be selected. The jumpers include a jumper 296 coupling terminal 286 to either terminal 258 or terminal 260, a jumper 297 coupling terminal 291 to either terminal 288 or terminal 290 and a jumper 298 coupling terminal 294 to either terminal 292 or terminal 293.

Operationally, flip-flops 214, 216 and 217 are reset by the strobe signal developed on line 74 at the beginning of each of the periods delineated thereby, preparing signal detector 32 for another acoustic-wave packet represented by the amplified-transducers-developed signal developed on line 64. At that time, the flip-flop comprising gates 210 and 211 is in a state that augments the positive and the negative reference potentials developed at respective ones of the nodes 224 and 230 to favor the polarity of half-cycle previously detected. Should the level of a positive half-cycle of the signal developed on line 64 rise above the positive reference potential developed at node 224 before a negative half-cycle of the signal falls below the negative reference potential developed at node 230, comparator 200 will develop a signal at node 246 that is coupled by gates 204, 206 and 208 to set, if necessary, the gate 210 and 211 flip-flop and clock flip-flop 214. Otherwise, comparator 202 will develop a signal at a node 250 that is coupled by gates 205, 207 and 209 to reset, if necessary, the gate 210 and 211 flip-flop and set flip-flop 214. Whether set or clocked, flip-flop 214 develops a gating signal on line 264 inhibiting further setting or resetting of the gate 210 and 211 flip-flop. Additionally, flip-flop 214 develops a signal on line 280 saturating transistor 220 which shorts to circuit ground the positive reference potential developed on line 224 preparing comparator 200 to detect zero crossings of the signal developed on line 64 and enabling flip-flop 215 preparing flip-flops 215–217 to count zero crossings.

When flip-flops 215–217 reach the predetermined count of zero crossings, the state of flip-flop 217 is changed, changing the state of the received signal developed on line 72. It is important to note that flip-flop 215 is only clocked by every other zero crossing, the polarity of the slope of which is set by jumper 296. Thus, when jumper 296 is suitably placed, when detector 32 changes from detecting a normal half-cycle to detecting the following half-cycle, the same zero-crossing count will be developed, reducing degradation of the meter accuracy due to acoustic wave attentuation and/or scattering.

Figure 3:
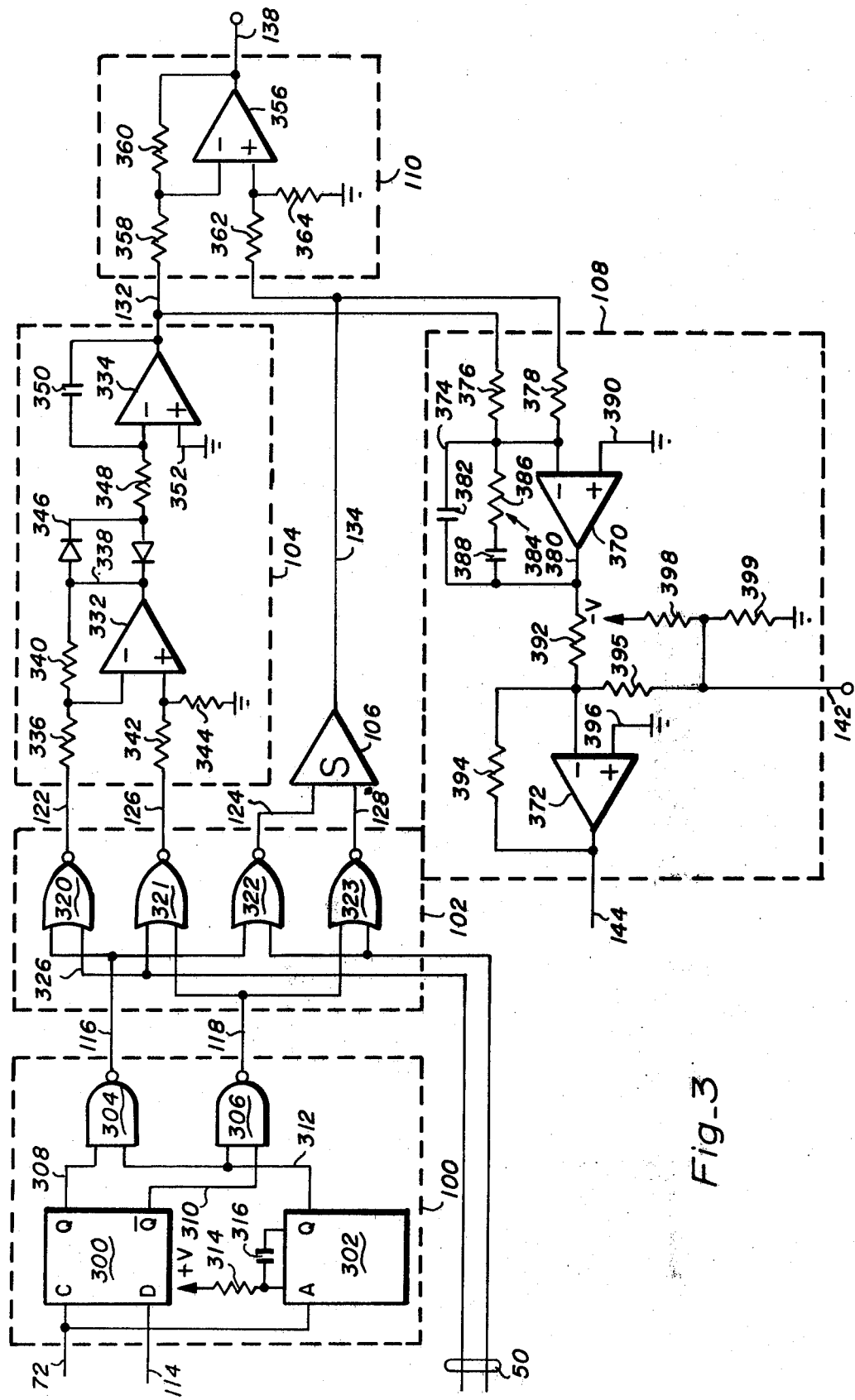
FIG. 3 is a schematic diagram further illustrating the phase detector, the decoder, the integrators and the summing amplifier all shown in FIG. 1.

Other components of subsystem 14 are illustrated in greater detail in FIG. 3. The principal components of phase detector 100 include a D-type flip-flop 300, a 1-shot multivibrator 302 and a pair of 2-input NAND gates 304 and 306. Flip-flop 300 has a clocking input connected to line 72, a data input connected to line 114, an output coupled by a line 308 to an input of gate 304 and a complementary output coupled by a line 310 to an input of gate 306. Multivibrator 302 has a triggering input connected to line 72, a pulse output coupled by a line 312 to the other input of gates 304 and 306 and a pair of timing inputs, the first being coupled by a time-constant-setting resistor 314 to a high logic level potential and by a time-constant-setting capacitor 316 to the other timing input of the multivibrator. Gate 304 has an output connected to line 116, and gate 306 has an output connected to line 118.

Decoder 102 includes four 2-input NOR gates 320–323. Gates 320 and 322 have an input connected to line 116, and gates 321 and 323 have an input connected to line 118. The other input of gates 320 and 321 is connected to a line 326 of bus 50, and the other input of gates 322 and 323 is connected to the other line of bus 50, a line 328. The output of gates 320–323 are each connected to a respective one of lines 122, 126, 124 and 128.

Integrators 104 and 106 are similar, with integrator 104 shown to include as active components a pair of operational amplifiers 332 and 334. Amplifier 332 is connected to combine, with similar gain but differing sign, the signals developed on lines 122 and 126. More specifically, amplifier 332 has an inverting input coupled to line 122 by an input resistor 336 and a line 338 by a feedback resistor 340, a non-inverting input coupled to line 126 by a voltage-divider resistor 342 and to circuit ground by another voltage-divider resistor 334 and an output connected to a line 338.

Amplifier 334 is connected as a simple integrator, the amplifier having an inverting input coupled to line 346 by an input resistor 348 and to line 132 by an integrating capacitor 350, a non-inverting input coupled to circuit ground by a line 352 and an output connected to line 132. A pair of diodes connected, back-to-back, between lines 338 and 346, couple pulses developed at the output of amplifier 332 to the input of the integrator connected amplifier, amplifier 334, while decoupling amplifier 332 from the integrator otherwise, preventing drift of the integrator caused by an offset which may be developed at the output of amplifier 332.

Summing amplifier 110 includes an operational amplifier 356 having an inverting input coupled to line 132 by an input resistor 358 and to line 138 by a feedback resistor 360, a non-inverting input coupled to line 134 by a voltage-divider resistor 362 and to circuit ground by another voltage-divider resistor 364 and an output connected to line 138.

Integrator 108 includes as active components a pair of operational amplifiers 370 and 372. Amplifier 370 is connected in an integrator configuration, the amplifier having an inverting input connected to a line 374 which is coupled to line 132 by a summing resistor 376, to line 134 by another summing resistor 378, to a line 380 by a simple-integrating capacitor 382 and by an augmenting-integrating-network 384. Network 384 includes the series combination of a roll-off resistor 386 and an integrating capacitor 388 connected between lines 374 and 380. Additionally, amplifier 370 has a non-inverting input coupled to circuit ground by a line 390 and an output connected to line 380. Amplifier 372 is connected in a summing configuration for combining with the integrator-developed intermediate potential the constant-level potential developed on line 142. More specifically, amplifier 372 has an inverting input coupled to line 380 by a summing resistor 392, to line 144 by a feedback resistor 394 and to line 142 by another summing resistor 395, a non-inverting input coupled to circuit ground by a line 396 and an output connected to line 144. The constant-level potential is developed on line 142 by a voltage-divider resistor 398 connected between a negative-power-supply potential and line 142 and another voltage-divider resistor 399 connected between line 142 and circuit ground.

Figure 4:
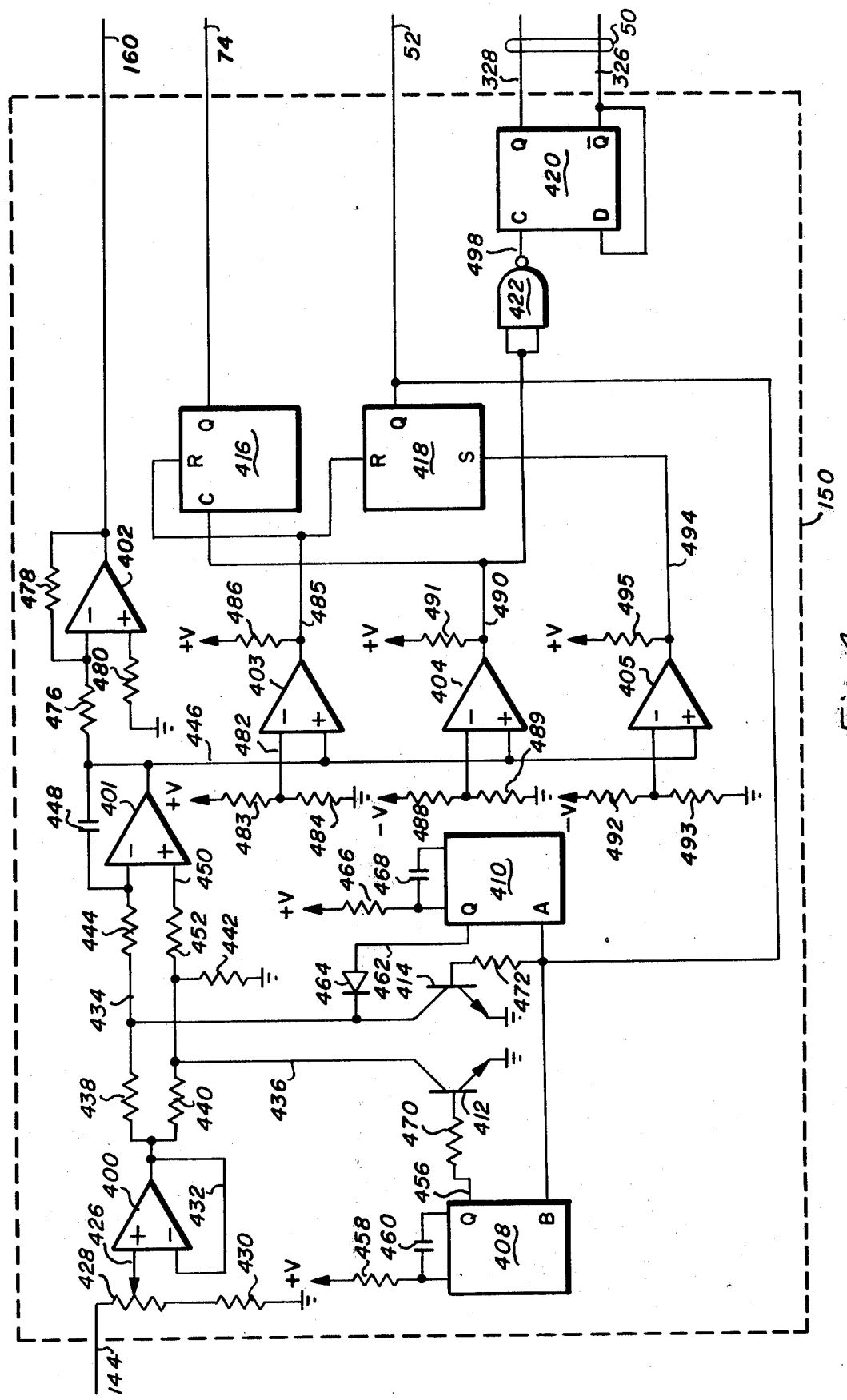
FIG. 4 is a schematic diagram further illustrating the ramp generator shown in FIG. 1.

Referring now to FIG. 4, ramp generator 150 is shown to include as active components six operational amplifiers 400–405, two 1-shot monostable multivibrators 408 and 410, two NPN transistors 412 and 414, three D-type flip-flops 416, 418 and 420 and a two-input NAND gate 422. Amplifier 400 has a non-inverting input coupled by a line 426 to the wiper of a potentiometer 428, the distal ends of which include an end connected to line 144 and an end coupled by a range limiting resistor 430 to circuit ground. Additionally, amplifier 400 has an inverting input and an output both of which are connected to a line 432. Amplifier 400 decouples line 426 and potentiometer 428 from amplifier 401.

Amplifier 401 is connected in an integrator configuration in which signals developed on a line 434 and a line 436 control the integrator. Both lines 434 and 436 are coupled to line 432, line 434 by an input resistor 438 and line 436 by a voltage divider resistor 440. Line 436 is further coupled to circuit ground by another voltage divider resistor 442. Amplifier 401 has an inverting input coupled to line 434 by an input resistor 444 and to a line 446 by a simple integrating capacitor 448, a non-inverting input connected to a line 450 that is coupled to line 436 by an offset and drift cancelling resistor 452 and an output connected to line 446.

Control of the integration is effectuated by multivibrators 408 and 410 in conjunction with transistors 412 and 414. Multivibrator 408 has a triggering input connected to line 52, a pulse output connected to a line 456 and a pair of timing inputs, one of which is coupled to a high-logic-level potential by a time-constant-setting resistor 458 and to the other timing input by a time-constant-setting capacitor 460. Similarly, multivibrator 410 has a triggering input connected to line 52, a pulse output connected to a line 462 that is coupled to line 434 by a steering diode 464 and a pair of timing inputs including an input which is coupled to a high-logic-level potential by a time-constant-setting resistor 466 and to the other timing input by a time-constant-setting capacitor 468. Transistor 412 has a base coupled to line 456 by a base-current-limiting resistor 470, an emitter connected to circuit ground and a collector connected to line 436. The base of transistor 414 is coupled to line 52 by a base-current-limiting resistor 472. Additionally, emitter of transistor 414 is connected to circuit ground, and the collector of the transistor is connected to line 434.

When transistor 412 is off, transistor 414 controls the direction of integration of the amplifier 401 integrator for ramp and retrace functions. Multivibrator 408, with transistor 412, provides a delay between the time marked by the transmit signal developed responsive to the integrator on line 52 and the start of the ramp to compensate for circuit delays in meter 10, especially those introduced by signal detector 32 (shown in FIG. 1) while zero crossings are being counted. Finally, multivibrator 410, with diode 464, provides a fixed delay before retrace to allow time for the excited transducer to settle before another acoustic wave pulse is transmitted. The retrace period is not employed for this purpose, because the retrace time is a function of the length of the communications link between the transducers. If sufficient time is allowed for a short link, an intolerable delay will be introduced for a long link.

The output of the integrator is amplified and buffered by amplifier 402 to develop the ramp signal on line 160. Amplifier 402 has an inverting input coupled to line 446 by an input resistor 476 and to line 160 by a feedback resistor 478, a non-inverting input coupled to circuit ground by an offset and drift cancelling resistor 480 and an output connected to line 160.

Amplifiers 403–405 are connected as comparators to compare the instantaneous level of each ramp of the signal developed on line 446 by the amplifier 401 integrator with reference levels to develop the timing for the strobe signal developed on line 74, the transmit signal developed on line 52 and the up/down signals developed on bus 50. Amplifier 403 has an inverting input connected to line 446, a non-inverting input coupled by a line 482 to the juncture of a pair of voltage divider resistors 483 and 484 connected between a positive-power-supply potential and circuit ground and an output connected to a line 485 which is coupled to a high-logic-level potential by a pull-up resistor 486. Similarly, amplifier 404 has an inverting input coupled to a negative-power-supply potential by a voltage divider resistor 488, to circuit ground by another voltage divider resistor 489, a non-inverting input connected to line 446 and an output connected to a line 490 which is coupled to a high-logic-level potential by a pull-up resistor 491. Finally, amplifier 405 has an inverting input connected to the juncture of a pair of voltage-divider resistors 492 and 493 connected between a negative-power-supply potential and circuit ground, a non-inverting input connected to line 446 and an output connected to a line 494 and coupled to a high-logic-level potential by a pull-up resistor 495.

Flip-flops 416 and 418 decode the signals developed by amplifiers 403-405. Flip-flop 416 has a clocking input connected to line 490, a resetting input connected to line 485 and an output connected to line 74. Flip-flop 418 has a resetting input connected to line 485, a setting input connected to line 494 and an output connected to line 52. Flip-flop 420 is connected in a divide by two configuration to develop the up/down signals on bus 50. Flip-flop 420 has a clocking input driven by gate 422 which is connected as an inverter with both inputs connected to line 490 and an output coupled to the clocking input by a line 498. Additionally, flip-flop 420 has a data input connected to line 326, a normal output connected to line 328 and a complementary output connected to line 326.

Figure 5:
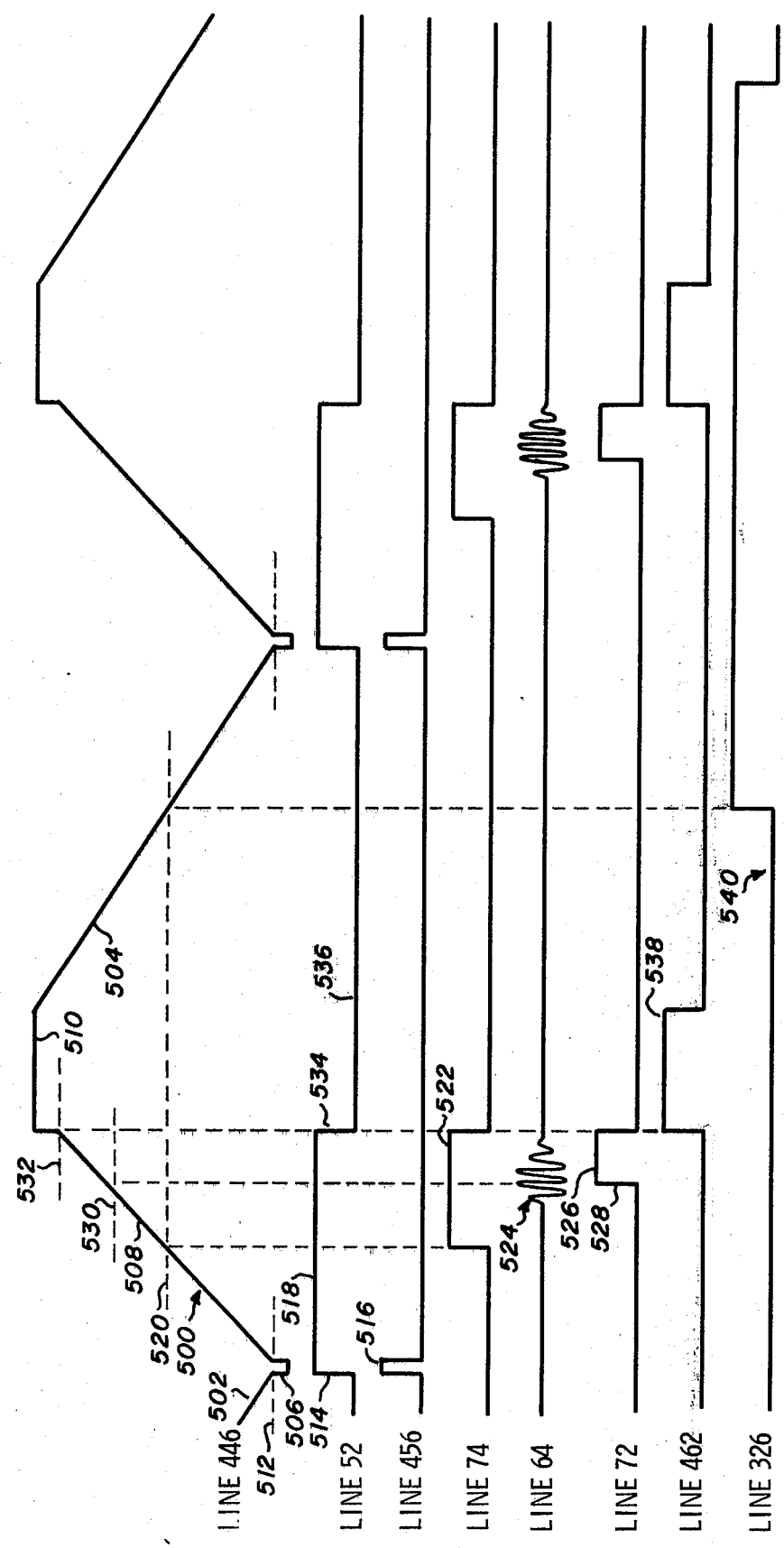
FIG. 5 is a timing diagram illustrating the various operative states of the components of the ramp generator shown in FIG. 4.

In order to explain the operation of ramp generator 150, additional reference is made to the timing diagram shown in FIG. 5 of the drawing. Illustrated therein, generally designated by the number 500, is the waveform of the signal developed on line 446 by the amplifier 401 integrator, which is amplified and inverted by amplifier 402 to develop the ramp signal on line 160. Waveform 500 is shown to include a succession of retrace portions including a portion 502 and a portion 504, a succession of compensating delay portions including a portion 506, a succession of ramps including a ramp 508 and a succession of transducer-setting delay portions including a portion 510.

The retrace portion is terminated when the level of the signal developed on line 446 falls below the potential level established by the resistor 492 and resistor 493 voltage divider, a level illustrated at 512. At this time, the amplifier 405 comparator changes the state of, sets, flip-flop 418 changing the state of the transmit signal developed on line 52. In addition to triggering the transmitter to transmit another acoustic wave packet, the leading edge of the transmit signal illustrated at 514 triggers multivibrator 408 which develops a corresponding pulse 516 in the signal developed on on line 456. Additionally, the high logic level of the signal developed on line 52, illustrated at 518, saturates transistor 414 which reverses the direction of integration of the amplifier 401 integrator. However, pulse 516 temporarily saturates transistor 412 appropriately delaying the start of ramp 508 thereby compensating for circuit delays, primarily the zero-crossing-counting delay of the signal detector. Thereafter, the amplifier 401 integrator develops ramp 508 so as to have a slope controlled by the acoustic-velocity signal developed on line 144.

When the level of ramp 508 exceeds the potential level established by the resistor 488 and resistor 489 voltage divider, a level illustrated at 520, the amplifier 404 comparator develops on line 490 a signal which clocks flip-flop 416. When so clocked, flip-flop 416 develops the strobe signal on line 74 so as to have the high logic level illustrated at 522 enabling the signal detector to process another signal developed responsive to the receipt of another acoustic wave packet. For illustrative purposes, the signal developed on line 64 (shown in FIG. 1) responsive to such a packet and the resultant received signal developed on line 72 (also shown in FIG. 1) are illustrated at 524 and 526, respectively. The corresponding leading edge of signal 526, an edge 528, is shown aligned with the time ramp 508 passes through a circuit-ground-reference-potential level, illustrated at 530. By adjusting the potential developed on line 144 thereby adjusting the slope of the ramps, including ramp 508, the system forces each of the ramps to pass through the circuit-ground-reference-potential level a period following the termination of the retrace portion which corresponds to the main propagation period of an acoustic wave packet between the transducers through the fluid.

Figure 6:
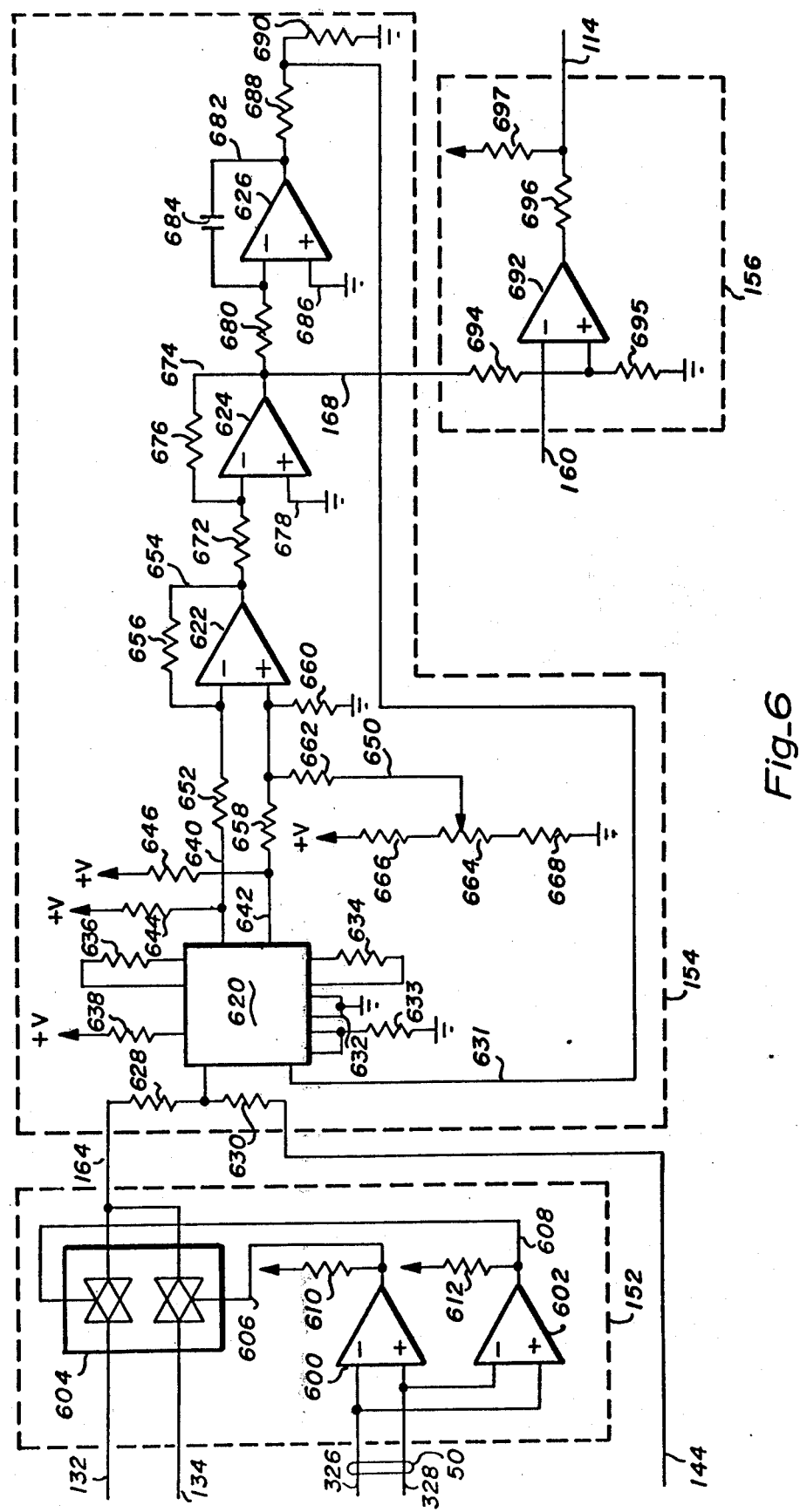
FIG. 6 is a schematic diagram further illustrating the multiplexer, the multiplier and the comparator all shown in FIG. 1.

Finally, when the level of ramp 508 exceeds the resistor 483 and resistor 484 voltage-divider-developed-potential level, a level illustrated at 532, the amplifier 403 comparator resets flip-flops 416 and 418 resetting to a low-logic-potential level the signals developed on lines 74 and 52. The transition of the signal developed on line 52, illustrated at 534, triggers multivibrator 410, and the subsequent low-logic-potential level, illustrated at 536, biases off transistor 414 again reversing the direction of integration of the amplifier 401 integrator. When so triggered, multivibrator 410 develops a pulse, such as a pulse 538, that delays the start of retrace portion 504 a sufficient period to allow the previously excited transducer to settle. Thereafter, the amplifier 401 integrator develops retrace portion 504 so as to have a slope controlled by the level of the signal developed on line 144. When the level of retrace portion 504 again falls below level 520, the amplifier 404 comparitor and gate 422 toggle flip-flop 420 reversing the state of the up/down signals including the signal developed on line 326 and illustrated at 540. Additional components of subsystem 16 are illustrated in greater detail in FIG. 6. Multiplexer 152 is shown to include a pair of operational amplifiers 600 and 602 and an analog switching device 604. Amplifier 600 has an inverting input connected to line 326, a non-inverting input connected to line 328 and an output connected to a line 606. Amplifier 602 has an inverting input connected to line 328, a non-inverting input connected to line 326 and an output connected to a line 608. Both lines 606 and 608 are coupled to a high-logic-level potential by a respective one of a pair of pull-up resistors 610 and 612. Device 604 has a first and a second control input connected to respective ones of lines 606 and 608, a first and a second signal input connected to respective ones of the lines 132 and 134 and a first and a second signal outputs both connected to line 164. In the preferred embodiment, device 604 is of the type which is known in the art as 4066.

The active components of multiplier 154 include a multiplying device 620 and three operational amplifiers 622, 624 and 626. Device 620 has a first multiplying input coupled to line 164 by a summing resistor 628 and coupled to line 144 by another summing resistor 630, a second multiplying input connected to a line 631, a pair of complementary inputs connected to circuit gound by a line 632, a pair of current-source-scaling inputs coupled to circuit ground by a biasing resistor 633, a pair of gain-setting terminals coupled by an emitter-degeneration resistor 634 and another pair of gain-setting terminals connected by another emitter-degeneration resistor 636, a common mode input coupled to a positive-power-supply potential by a biasing resistor 638 and a complementary pair of signal outputs connected to respective ones of a pair of lines 640 and 642. Both lines 640 and 642 are coupled by respective ones of a pair of load resistors 644 and 646 to a positive-power-supply potential.

Amplifier 622 converts the output of device 620 from complementary to single ended and sums with the complementary signals developed by device 620 a constant level potential developed on a line 650. More specifically, amplifier 622 has an inverting input coupled to line 640 by an input resistor 652 and to a line 654 by a feedback resistor 656, a non-inverting input coupled by a summing resistor 658 to a line 642, a voltage divider resistor 660 to circuit ground and to line 650 by another summing resistor 662 and an output connected to line 644. The constant level potential is developed on line 650 by a loop gain adjusting potentiometer 664 having a wiper connected to line 650 and distal ends one coupled to a positive-power-supply potential by a range-limiting resistor 666 and the other coupled to circuit ground by another range-limiting resistor 668.

Amplifier 624 provides additional loop gain, having an inverting input coupled to line 644 by an input resistor 672 and to a line 674 by a feedback resistor 676, a non-inverting input coupled to circuit ground by a line 678 and an output connected to line 674.

Amplifier 626 is connected in a simple integrator configuration having an inverting input coupled to line 674 by an input resistor 680 and to a line 682 by a simple integrating capacitor 684, a non-inverting input coupled to circuit ground by a line 686 and an output connected to line 682. Line 682 is coupled by a voltage divider resistor 688 to line 631 which is coupled to circuit ground by another voltage divider resistor 690.

Device 620 multiplies the level of the sum of the signals developed on lines 164 and 144 by that of the signal developed on line 631 to develop a product signal which drives amplifier 622. Amplifier 622 combines therewith a constant signal developed on line 650. The signal representing the sum, following amplification by amplifier 624, drives the amplifier 626 integrator which drives device 620 forming a closed loop. Since, at steady state, the input to the amplifier 626 must be zero, the signal developed by device 620 must be a constant equal in amplitude and opposite in sign of that developed on line 650. Further, since the third signal developed on line 144 is proportional to the acoustic velocity in the fluid, and the steady state level of the multiplexed signal developed on line 164 is zero, the amplifier 626 integrator is forced by the loop to develop a signal on line 631 inversely proportional to the acoustic velocity. Thus, the level of the multiplexed signal developed on line 164 is multipled by a signal inversely proportional to the acoustic velocity developing the multiplied multiplexed signal on line 168.

Comparator 156 includes an operational amplifier 692 having an inverting input connected to line 160 and a non-inverting input connected to the juncture of a pair of voltage-divider resistor 694 and 695 connected between line 168 and circuit ground. Additionally, amplifier 692 has an output coupled by a voltage divider resistor 696 to line 114 which is coupled to a positive-power-supply potential by another voltage divider resistor 697.

It is anticipated that after having read the preceding disclosure certain alterations and modifications of the present invention will no doubt become apparent to those skilled in the art, it is therefore intended that the following claims be interpreted to cover all such alterations and modifications as fall within the true spirit and scope of the invention.

We claim:

1. A meter for measuring the average velocity of a fluid in a pipe or other conduct comprising:
   means for generating a signal including a succession of linear ramps, a transmit signal derived from said ramps and an up/down signal derived from said ramps;
   acoustic transmission means including a pair of transducers disposed to define therebetween a communications link through the fluid, said transmission means for exciting a one of said transducers selected responsive to said up/down signal to transmit an acoustic wave packet across said link at each of the times marked by said transmit signal and for developing a received signal marking a series of times each referenced to the time a respective one of said packets excites the other one of said transducers;
   means for comparing said ramp signal with a comparison signal and for developing a reference signal marking a series of times each referenced to a time at which the level of said ramp signal coincides with that of said comparison signal;
   phase detector means responsive to said received signal and said reference signal, said phase detector means for developing an early signal marking each instance a one of the times marked by said received signal preceeds a respective time marked by said refrence signal and a late signal marking each instance a one of the times marked by said received signal succeeds a respective time marked by said reference signal; and
   control means responsive to said up/down signal, said early signal and said late signal, control means for developing a signal indicative of the velocity of the fluid and for developing said comparison signal whose amplitude is representative of the velocity of the fluid in the pipe divided by sound speed, said control means being operative to cause the times marked by said reference signal to track said times marked by said received signal.

2. A meter as recited in claim 1 wherein said control means includes:
   decoder means responsive to said up/down signal, said decoder means for developing an early-upstream signal marking those instances marked by said early signal which correspond to ones of said packets transmitted in an upstream direction across said link, for developing an early-downstream signal marking the other ones of said early signal instances, a late-upstream signal marking those instances marked by said late signal which corresponds to ones of said packets transmitted in said upstream direction across said link, and a late-downstream signal marking the other ones of said late signal instances,
   first integrator means incremented in one direction responsive to instances marked by said early-upstream signal and incremented in the other direction responsive to instances marked by said late-upstream signal, said first integrator means for developing a first signal,
   second integrator means incremented in one direction responsive to instances marked by said early-downstream signal and incremented in the other direction responsive to instances marked by said late-downstream signal, said second integrator means for developing a second signal, means for combining with suitable sign said first and said second signals to develop said fluid velocity indicating signal, means responsive to said up/down signal for multiplexing said first and said second signals to develop a chopped signal, and means for developing said comparison signal responsive to said chopped signal.

3. A meter as recited in claim 2 further including third integrating means having means for combining with suitable sign said first and said second signals, said third integrator means for integrating said combined first and second signals to develop a third signal indicative of the acoustic velocity in said fluid.

4. A meter as recited in claim 3 wherein said ramp generating means is responsive to said third signal and operative to develop each of said ramps so as to have a slope that is proportional to the level of said third signal.

5. A meter as recited in claim 3 wherein said comparison signal developing means includes first product means reponsive to said third signal, said first product means for developing a signal inversely proportional the acoustic velocity in said fluid and for multiplying the level of said chopped signal by said inverse acoustic velocity signal to develop said comparison signal.

6. A meter as recited in claim 5 wherein said first product means includes:

fourth integrator means for integrating said comparison signal to develop said inverse acoustic velocity signal, second product means having means for combining said chopped signal and said third signal, said second product means for multiplying said inverse acoustic velocity signal by said combined chopped and third signal to develop a product signal and, means for combining said product signal with a predetermined constant level signal to develop said comparison signal.

7. A meter as recited in claim 5 wherein said acoustic transmission means includes signal detection means for receiving a transducer signal developed responsive to said excitation of said other transducer and for developing said received signal, said signal detecting means including leading edge detecting means having means for comparing the level of said transducer signal with that of a positive reference potential and means for comparing the level of said transducer signal with that of a negative reference potential, said leading edge detecting means for detecting a half-cycle of said transducer signal developed responsive to the leading edge of said packet, means coupled to said leading edge detecting means for developing said positive and said negative reference potentials so as to favor the detection of that polarity half-cycle most recently detected, and means coupled to said leading edge detecting means for developing said received signal by counting zero crossings of said transducer signal which occur after said half-cycle is detected and which cross with a slope having a predetermined sign, whereby said received signal is developed so as to be independent of whether said detected half-cycle is the one most commonly detected or the one following.

8. A meter as recited in claim 5 wherein said ramp generator means includes fifth integrator means for integrating said third signal to develop said ramp signal and means responsive to said transmit signal for resetting said fifth integrator means.

9. A meter as recited in claim 8 wherein said ramp generator means further includes means for comparing the level of said ramp signal with that of a predetermined potential to develop a resetting signal, means for comparing the level of said ramp signal with that of another predetermined potential to develop a setting signal, and flip-flop means reset by said resetting signal and set by said setting signal for developing said transmit signal.

10. A meter as recited in claim 9 wherein said fifth integrator resetting means includes means responsive to said transmit signal for controlling the direction of integration of said fifth integrator and means responsive to each of said times marked by said transmit signal for delaying the integration by said fifth integrator for a predetermined period.

11. A meter as recited in claim 1 wherein said acoustic transmission means includes signal detection means for receiving a transducer signal developed responsive to said excitation of said other transducer and for developing said received signal, said signal detecting means including leading edge detecting means having means for comparing the level of said transducer signal with that of a positive reference potential and means for comparing the level of said transducer signal with that of a negative reference potential, said leading edge detecting means for detecting a half-cycle of said transducer signal developed responsive to the leading edge of said packet, means coupled to said leading edge detecting means for developing said positive and said negative reference potentials so as to favor the detection of that polarity half-cycle most recently detected, and means coupled to said leading edge detecting means for developing said comparison signal by counting zero crossings of said transducer signal which occur after said half-cycle is detected and which cross with a scope having a predetermined sign, whereby said comparison signal is developed so as to be independent of whether said detected half-cycle is the one most commonly detected or the one following.

12. A meter as recited in claim 1 wherein said ramp generator means includes fifth integrator means for integrating said third signal to develop said ramp signal and means responsive to said transmit signal for resetting said fifth integrator means.

13. A meter as recited in claim 12 wherein said ramp generator means further includes means for comparing the level of said ramp signal with that of a predetermined potential to develop a resetting signal, means for comparing the level of said ramp signal with that of another predetermined potential to develop a setting signal, and flip-flop means reset by said resetting signal and set by said setting signal for developing said transmit signal.

14. A meter as recited in claim 13 wherein said fifth integrator resetting means includes means responsive to said transmit signal for controlling the direction of integration of said fifth integrator and means responsive to each of said times marked by said transmit signal for delaying the integration by said fifth integrator for a predetermined period.

* * * * *